(12) United States Patent
Chakra et al.

(10) Patent No.: US 11,102,161 B2
(45) Date of Patent: Aug. 24, 2021

(54) SOCIAL NETWORKING SERVICE CONTENT SHARING

(71) Applicant: International Business Machines Corporation, Armonk, NY (US)

(72) Inventors: Al Chakra, Apex, NC (US); Faisal Ghaffar, Dunboyne (IE); Ahmad Abdul Wakeel, Dublin (IE); Kevin C. Carr, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/123,025

(22) Filed: Sep. 6, 2018

(65) Prior Publication Data
US 2020/0084172 A1    Mar. 12, 2020

(51) Int. Cl.
*H04L 12/58* (2006.01)
(52) U.S. Cl.
CPC .............. *H04L 51/32* (2013.01); *H04L 51/14* (2013.01); *H04L 51/26* (2013.01)
(58) Field of Classification Search
CPC ..... G06Q 10/107; H04L 12/585; H04L 12/58; H04L 12/581; H04L 12/5855
USPC ........................................................ 709/206
See application file for complete search history.

(56) References Cited

U.S. PATENT DOCUMENTS

| | | |
|---|---|---|
| 8,056,010 B2 | 11/2011 | Kieselbach et al. |
| 8,924,326 B2 | 12/2014 | Arquette et al. |
| 8,930,826 B2 | 1/2015 | Lu et al. |
| 8,972,402 B1 | 3/2015 | Gupte et al. |
| 9,094,355 B1 | 7/2015 | Duddu et al. |
| 9,110,953 B2 | 8/2015 | Steinberg et al. |
| 9,172,671 B2 | 10/2015 | Bates et al. |
| 9,419,808 B2 | 8/2016 | Chakra et al. |
| 2009/0259621 A1* | 10/2009 | Svendsen ............... G06Q 30/02 |
| 2012/0192085 A1* | 7/2012 | Lu ......................... G06Q 10/107 |
| | | 715/752 |
| 2014/0108560 A1* | 4/2014 | Samdahl ................. H04L 51/00 |
| | | 709/206 |
| 2016/0140219 A1 | 5/2016 | Chakra et al. |
| 2018/0232460 A1* | 8/2018 | Goryachev .......... G06F 16/9535 |
| 2019/0280986 A1* | 9/2019 | Anderson ........... H04L 67/2804 |

* cited by examiner

*Primary Examiner* — Hermon Asres
(74) *Attorney, Agent, or Firm* — Cantor Colburn LLP; Teddi Maranzano

(57) ABSTRACT

An example implementation for social networking service content sharing provides a computer-implemented method that includes analyzing content to be shared on a social networking service, the content being directed to a plurality of potential recipients. The method further includes analyzing the plurality of potential recipients to calculate a plurality of probability scores for each of the plurality of potential recipients. The method further includes calculating a recipient score for each of the plurality of potential recipients based at least in part on the plurality of probability scores for each of the plurality of potential recipients. The method further includes generating a metadata table for the plurality of potential recipients based at least in part on the recipient score for each of the plurality of potential recipients and designating a subset of the plurality of potential recipients to receive the content based at least in part on the metadata table.

20 Claims, 6 Drawing Sheets

SOCIAL NETWORKING SERVICE CONTENT SHARING

BACKGROUND

The present invention generally relates to social network services, and more specifically, to social networking service content sharing.

Social network services are online platforms that enable members to establish networks or relationships with one another. Social network services utilize websites, applications (or "apps"), and other similar interfaces. Members can connect with other members, form groups, share content, play games, etc.

SUMMARY

Embodiments of the present invention are directed to a computer-implemented method for social networking service content sharing. A non-limiting example of the computer-implemented method includes analyzing, by a processing device, content to be shared on a social networking service, the content being directed to a plurality of potential recipients. The method further includes analyzing, by the processing device, the plurality of potential recipients to calculate a plurality of probability scores for each of the plurality of potential recipients. The method further includes calculating, by the processing device, a recipient score for each of the plurality of potential recipients based at least in part on the plurality of probability scores for each of the plurality of potential recipients. The method further includes generating, by the processing device, a metadata table for the plurality of potential recipients based at least in part on the recipient score for each of the plurality of potential recipients. The method further includes designating, by the processing device, a subset of the plurality of potential recipients to receive the content based at least in part on the metadata table.

Embodiments of the present invention are directed to a system. A non-limiting example of the system includes a memory comprising computer readable instructions and a processing device for executing the computer readable instructions for performing a method for social networking service content sharing.

Embodiments of the invention are directed to a computer program product. A non-limiting example of the computer program product includes a computer readable storage medium having program instructions embodied therewith. The program instructions are executable by a processor to cause the processor to perform a method for social networking service content sharing.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
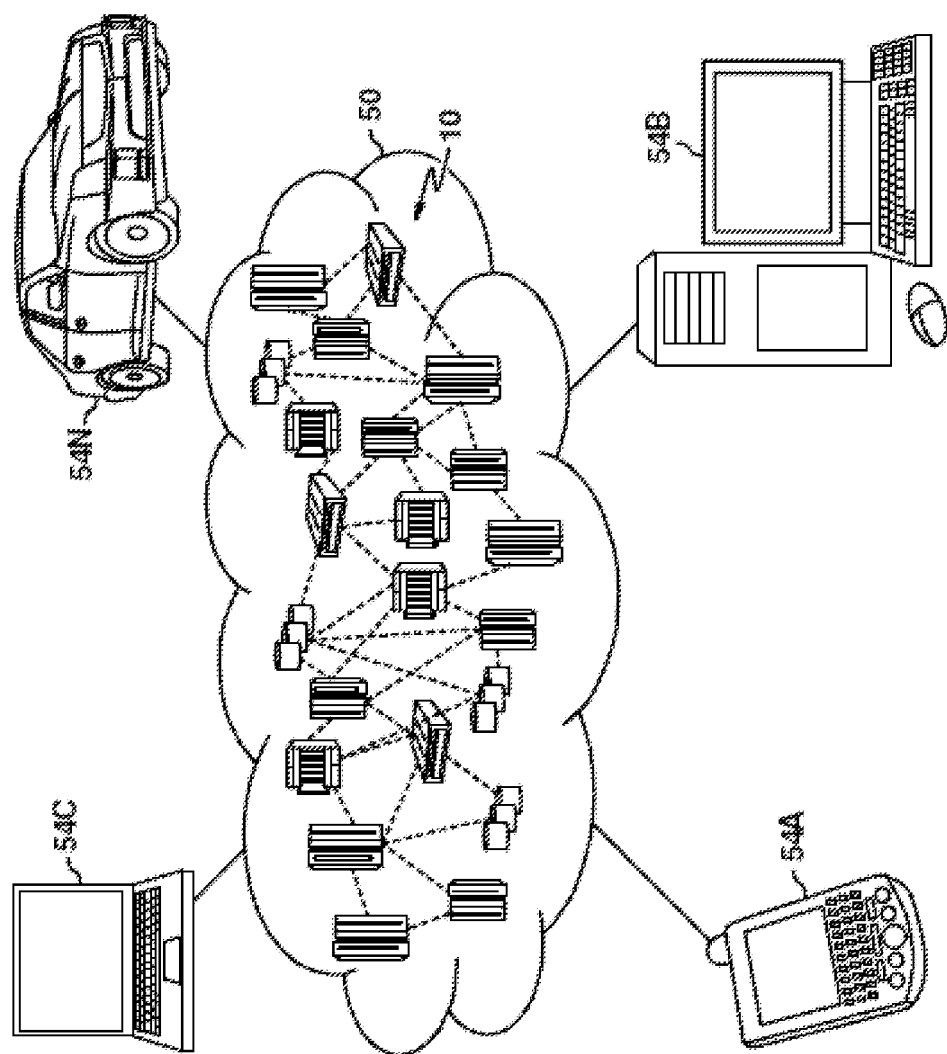
FIG. 1 depicts a cloud computing environment according to one or more embodiments described herein.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
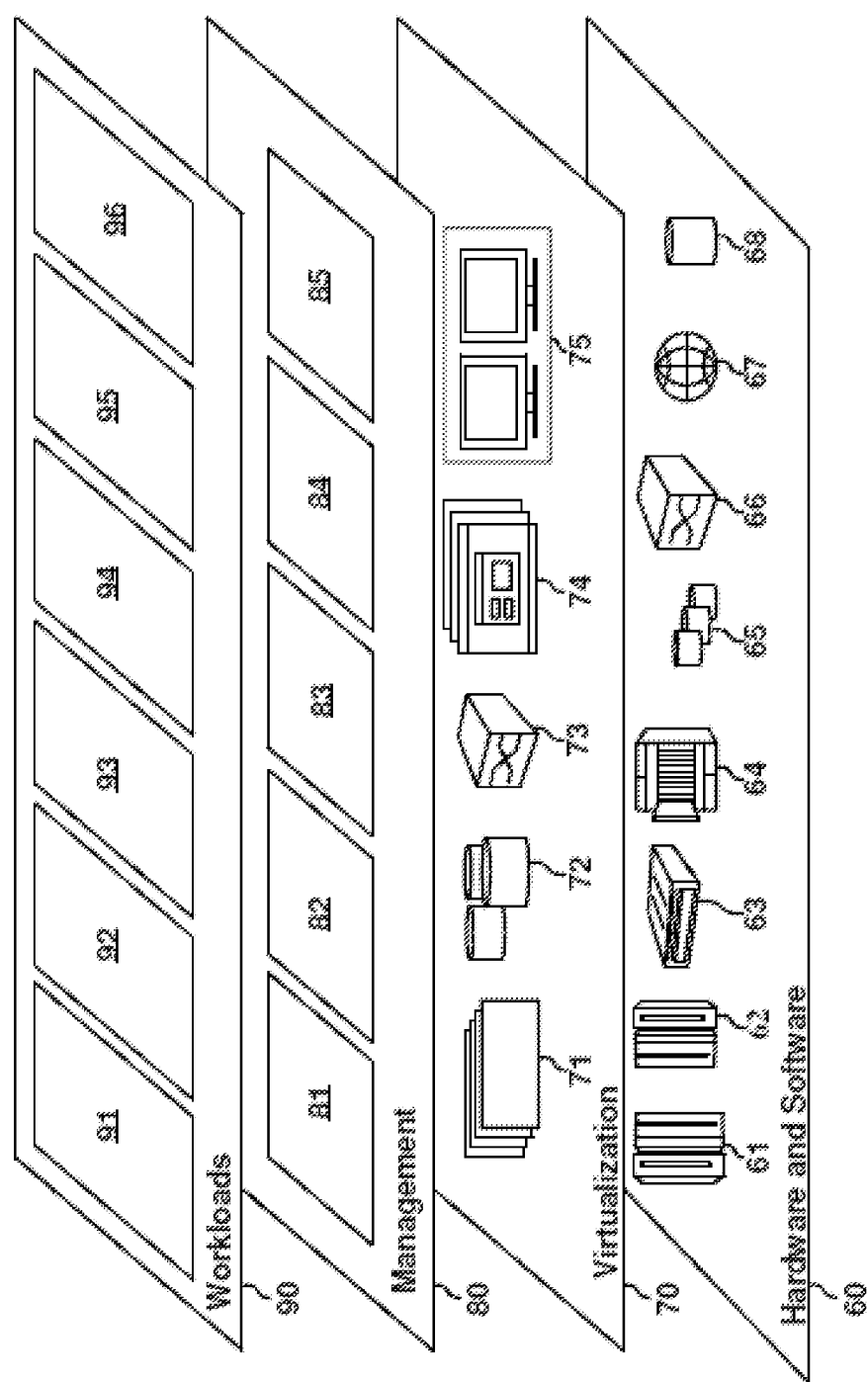
FIG. 2 depicts abstraction model layers according to one or more embodiments described herein.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and social networking service content sharing 96.

Figure 3:
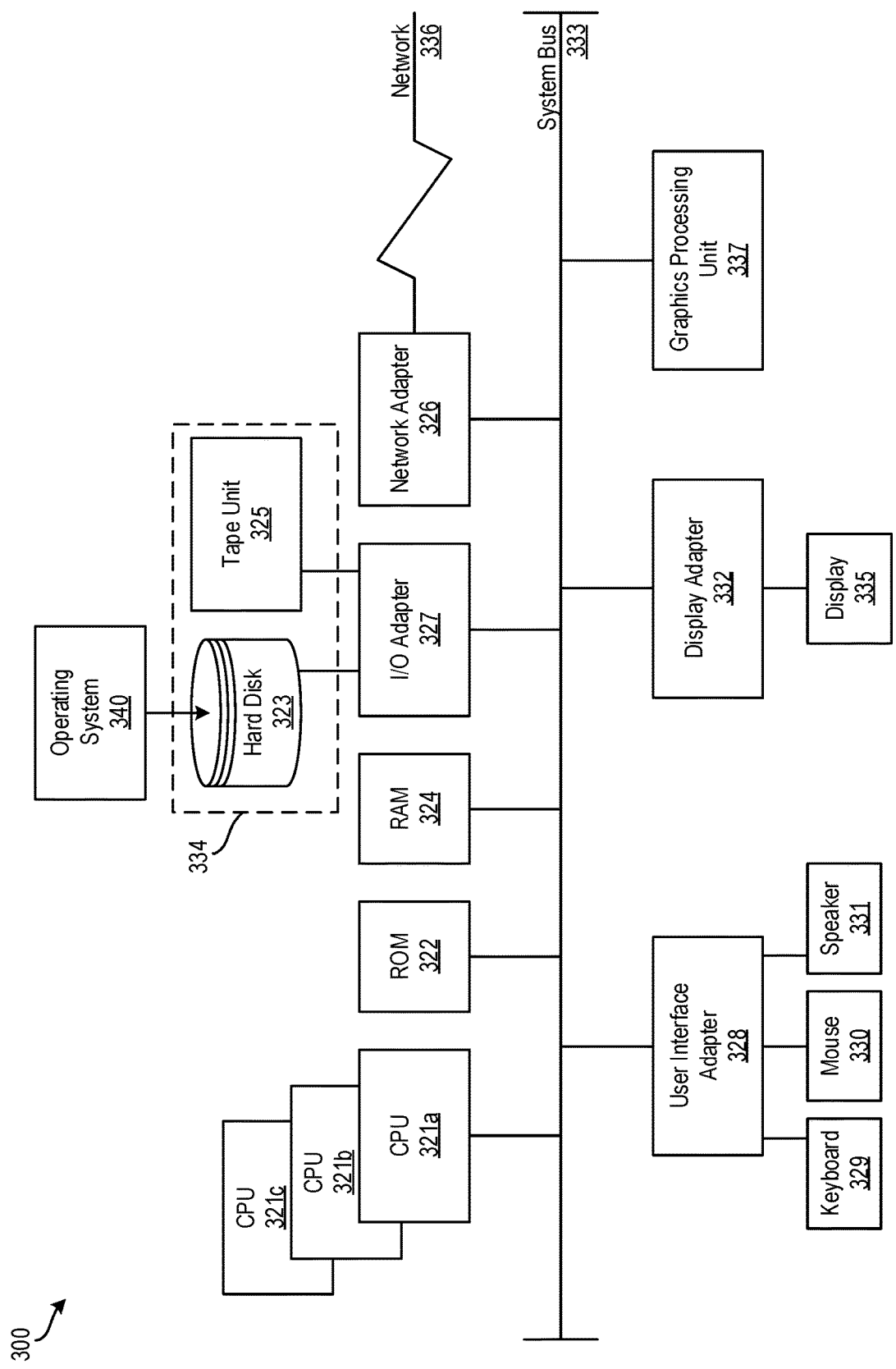
FIG. 3 depicts a block diagram of a processing system for implementing the techniques described herein according to one or more embodiments described herein.

It is understood that the present disclosure is capable of being implemented in conjunction with any other type of computing environment now known or later developed. For example, FIG. 3 depicts a block diagram of a processing system 300 for implementing the techniques described herein. In examples, processing system 300 has one or more central processing units (processors) 321a, 321b, 321c, etc. (collectively or generically referred to as processor(s) 321 and/or as processing device(s)). In aspects of the present disclosure, each processor 321 can include a reduced instruction set computer (RISC) microprocessor. Processors 321 are coupled to system memory (e.g., random access memory (RAM) 324) and various other components via a system bus 333. Read only memory (ROM) 322 is coupled to system bus 333 and may include a basic input/output system (BIOS), which controls certain basic functions of processing system 300.

Further depicted are an input/output (I/O) adapter 327 and a network adapter 326 coupled to system bus 333. I/O adapter 327 may be a small computer system interface (SCSI) adapter that communicates with a hard disk 323 and/or a tape storage device 325 or any other similar component. I/O adapter 327, hard disk 323, and tape storage device 325 are collectively referred to herein as mass storage 334. Operating system 340 for execution on processing system 300 may be stored in mass storage 334. The network adapter 326 interconnects system bus 333 with an outside network 336 enabling processing system 300 to communicate with other such systems.

A display (e.g., a display monitor) 335 is connected to system bus 333 by display adapter 332, which may include a graphics adapter to improve the performance of graphics intensive applications and a video controller. In one aspect of the present disclosure, adapters 326, 327, and/or 232 may be connected to one or more I/O busses that are connected to system bus 333 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 333 via user interface adapter 328 and display adapter 332. A keyboard 329, mouse 330, and speaker 331 may be interconnected to system bus 333 via user interface adapter 328, which may include, for example, a Super I/O chip integrating multiple device adapters into a single integrated circuit.

In some aspects of the present disclosure, processing system 300 includes a graphics processing unit 337. Graphics processing unit 337 is a specialized electronic circuit designed to manipulate and alter memory to accelerate the creation of images in a frame buffer intended for output to a display. In general, graphics processing unit 337 is very efficient at manipulating computer graphics and image processing, and has a highly parallel structure that makes it more effective than general-purpose CPUs for algorithms where processing of large blocks of data is done in parallel.

Thus, as configured herein, processing system 300 includes processing capability in the form of processors 321, storage capability including system memory (e.g., RAM 324), and mass storage 334, input means such as keyboard 329 and mouse 330, and output capability including speaker 331 and display 335. In some aspects of the present disclosure, a portion of system memory (e.g., RAM 324) and mass storage 334 collectively store an operating system such as the AIX® operating system from IBM Corporation to coordinate the functions of the various components shown in processing system 300.

Turning now to an overview of technologies that are more specifically relevant to aspects of the invention, technical solutions are provided for improving social networking services. In particular, the present techniques provide improved content sharing within social networking services. Generally, social networking services utilize a network, such as the Internet, to enable members to "connect" to one another and form social groups. Members of a social network service may desire to share content, such as text, an image, video, etc., with other members (e.g., their friends, colleagues, those with similar interests, other members of a shared group, etc.). However, the other members may not desire to see particular content, may miss desired content because of an abundance of undesired content, etc. This results in a technical problem of lack of personalized content sharing for a member of the social networking service at the content producer side before the content is published/posted. The content producer needs to know in advance how the content being created will be consumed and who will be the consumer of the content. Current social networking service technologies fail to address this technical problem specifically arising in the realm of computer networks and social networking services. Specifically, current social networking service technologies fail to address the dynamic nature that recipients' preferences can change in real-time. Additionally, existing social networking service technologies fail to aiding content producers in making informed decisions when selecting a sub-set of recipients or changing the content before publishing.

Turning now to an overview of the aspects of the invention, one or more embodiments of the invention address the above-described shortcomings of the prior art by providing improved content sharing in social networking services. The technical solutions described herein address the technical problem by generating a metadata table for potential recipients and using the metadata table to designate a subset of potential recipients to receive the content. In some examples, the content can be changed to maximize the number of potential recipients interested in the content. In other examples, one or more potential recipients for the content can be targeted based on the recipients' score and/or by tagging the recipients. The metadata table includes information about possible reactions by potential recipients for content being produced by a content producer. The metadata table is generated based on a recipient score for each potential recipient.

The recipient score is calculated from probability scores for each potential recipient and the content is analyzed. The probability scores are related to various social networking behaviors of the recipient and can be calculated based on recipients' previous responses or reactions (e.g., content of a reply/comment) to different types of content/posts along with recipients' behavior (e.g., forwarding, liking, etc.). For example, a probabilistic model can be used to predict probability of a recipient liking, forwarding, replying, etc., to particular content. Furthermore, daily usage statistics from a social networking service can provide a recipient's social patterns. These social patterns can be extracted to predict whether the recipient may be active or not at a certain time (e.g., when the content is planned to be published).

The recipient score can be calculated using regression modeling, where the recipient's score is modeled with a set of independent variables representing the recipient's networking behavior and reaction to certain content. For example, the recipient score can be expressed as follows:

$$\text{recipient score} = \alpha_1\beta_1 + \alpha_2\beta_2 \ldots \alpha_n\beta_n + \in$$

where $\beta_1, \beta_2, \ldots \beta_n$ are networking and reaction factors of the recipient. From this, the recipient score in the metadata table can be weighted based on the regression equation for the probability scores for each potential recipient.

As a result, the technical solutions aid in creating quality content that is personalized and directed to a particular consumer set (i.e., members of the subset of potential recipients that receive the content). This increases the likelihood that content is not ignored by members, and that these same members are not unnecessarily bombarded with information. Accordingly, by designating a subset of the plurality of potential recipients to receive the content based at least in part on the metadata table, social networking service technology is improved. Users can be more engaged because they are receiving relevant content, and content providers can be confident that their content is reaching the appropriate consumers. For example, content producers receive real-time feedback for their content and hence have the opportunity to further customize or personalize their content to reach an intended group of potential recipients. Additionally, the present techniques can be configured to give more weight to certain aspects at one time and other aspects at another. For example, at one point, a content producer is interested in having his content disseminated to as large of an audience as possible, while at another point, the content producer is looking for feedback or reaction of the audience. Hence, the configurable nature of the present techniques enable appropriate potential recipients to be identified and targeted.

The above-described aspects of the invention address the shortcomings of the prior art by providing a scoring mechanism that fuses multiple factors (social, temporal, relational, attributes correlation, etc.) to compute an aggregated score (i.e., the recipient score) for each intended recipient in a social group. These factors can include, but are not limited to, recipient activeness (e.g., time spent on social network service and when the time is spent), similarity between recipient and content author, interest of recipient to the topic of the content and the possible reaction based on previous history, etc. The aggregated score is based on regression weights and/or on the weighted average for each of these factors. The present techniques also generate a table of records (i.e., a metadata table) for potential recipients and their relevance to unpublished content type. This table is leveraged to improve the accuracy of the social networking services by using it in the feedback loop for future posts. As an example, the feedback loop is useful to prepare future content by tailoring or customizing the content to particular users or to particular behaviors. For example, the metadata includes the information about recipients' anticipated reactions to a particular type of content. The content can be revised or updated to account for the recipient's anticipated reactions. This increases content relevancy to users of the social networking services. The present techniques can also provide a user interface to display the metadata table to a user who can then make an informed decision regarding whom to direct particular content.

Figure 4:
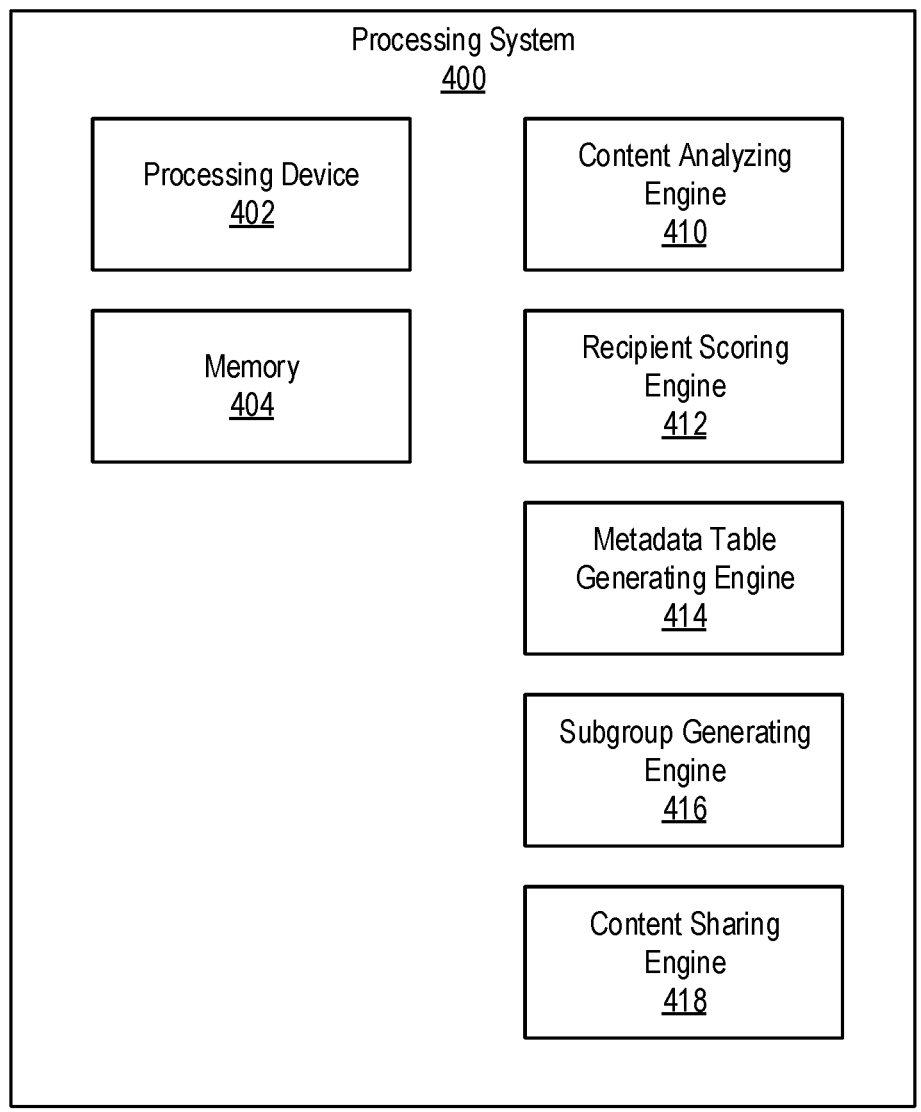
FIG. 4 depicts a block diagram of a processing system for social networking service content sharing according to one or more embodiments described herein.

Turning now to a more detailed description of aspects of the present invention, FIG. 4 depicts a block diagram of a processing system 400 for social networking service content sharing according to one or more embodiments described herein. The processing system 400 includes a processing device 402, a memory 404, a content analyzing engine 410, a recipient scoring engine 412, a metadata table generating engine 414, a subgroup generating engine 416, and a content sharing engine 418.

The various components, modules, engines, etc. described regarding FIG. 4 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 402 for executing those instructions. Thus a system memory (e.g., memory 404) can store program instructions that when executed by the processing device 402 implement the engines described herein. Other engines can also be utilized to include other features and functionality described in other examples herein. One or more of the engines 410, 412, 414, 416, 418 can be implemented in a cloud computing environment, such as the cloud computing environment 50 of FIG. 1.

Figure 5:
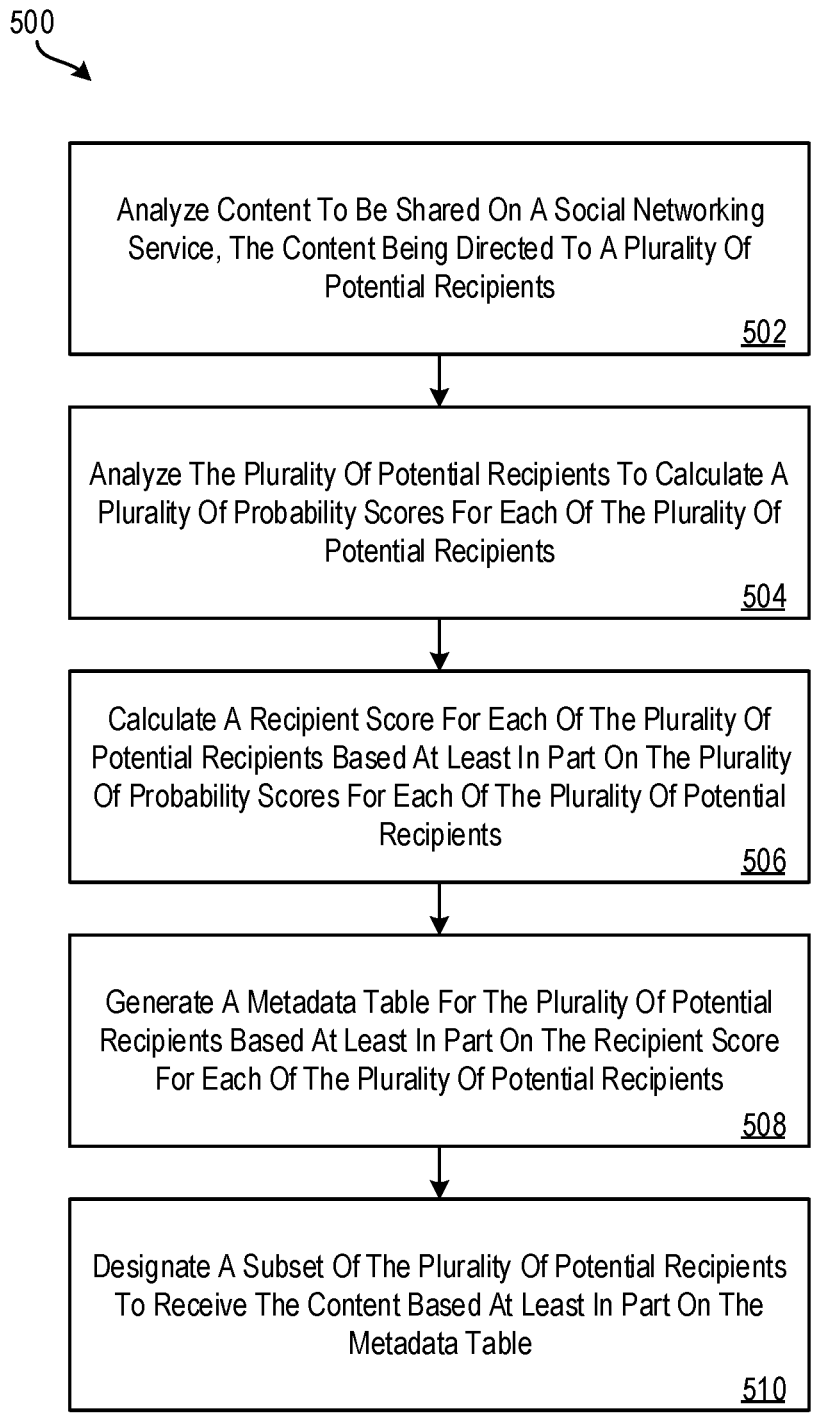
FIG. 5 depicts a flow diagram of a method for social networking service content sharing according to one or more embodiments described herein.

The functionality and capabilities of the engines 410, 412, 414, 416, 418 of FIG. 4 are now described in more detail with reference to FIG. 5. In particular, FIG. 5 depicts a flow diagram of a method 500 for social networking service content sharing according to one or more embodiments described herein.

At block 502, the content analyzing engine 410 analyzes content to be shared on a social networking service, the content being directed to a plurality of potential recipients. The content analyzing engine 410 analyzes the content to identify and/or infer information or metadata associated with the content, such as subject, sentiment of the content, etc. For example, the content analyzing engine 410 can perform a content subject analysis to determine a subject, topic, or domain of the content, examples of which can include "food," "automotive," "parenting," "sports," and others. In another example, the content analyzing engine 410 can perform a content sentiment analysis to determine a sentiment of the content, which can identify an attitude of the author of the content (e.g., a negative attitude, a positive attitude, etc.). It should be appreciated that the content analyzing engine 410 can perform these and other natural language processing analyses, text analyses, computational linguistics analyses, and other types of analyses on the content to identify information about the content.

At block 504, the recipient scoring engine 412 analyzes the plurality of potential recipients to calculate a plurality of probability scores for each of the plurality of potential recipients. Examples of calculated probability scores can include a recipient reaction score, a recipient similarity score, a content interest score, and a recipient activeness score, reaction type (e.g., like, view, forward, comment, etc.) among others. The recipient reaction score measures the potential recipient's reaction to similar previous posts (e.g., did the recipient like the post, dismiss the post, block the post, comment on the post, share the post, etc.). The recipient similarity score measures a similarity between the content providing user and the potential recipient (e.g., whether the users share similar interests). There are a number of ways to measure similarity between interests of two individuals. One way is by calculating a Jaccard Index, which measures the common set of attributes between both entities out all possible attributes. Cosine similarity is another technique. Another approach can include clustering individuals based on the content of the individuals' profiles on the social networking service. The content interest score measures how interested an intended recipient is in the content. The recipient activeness score measures how active the intended recipient is in the group, on the social networking service, etc. (e.g., a less active user may not be interested in a particular post while a more active user may be interested in the same post). This can be determined directly from usage of the social networking service. For example, based on usage statistics or logs provided by the social networking service, it is possible to determine a pattern of activeness for a recipient in terms of when the recipient is active on the social networking service (e.g., particular times of day, days of week, etc.), how long the user is active, and the like.

The recipient scoring engine 412 can use various techniques to calculate the probability scores for each of the potential recipients. For example, the recipient scoring engine 412 can utilize regression analysis, weighted averages, and/or other statistical analysis, estimation, scoring, ranking, and/or modeling techniques to analyze the potential recipients and calculate the probability scores (e.g., the recipient reaction score, the recipient similarity score, the content interest score, the recipient activeness score, etc.).

At block 506, the recipient scoring engine 412 calculates a recipient score for each of the plurality of potential recipients based at least in part on the plurality of probability scores for each of the plurality of potential recipients. By calculating a recipient score based on the probability scores, the recipient scoring engine 412 fuses multiple factors (social, temporal, relational, attributes correlation, etc.) to compute an aggregated score (i.e., the recipient score) for each intended recipient in a social group. In one example, the recipient scoring engine 412 uses the weighted average of the four probability scores (e.g., the recipient reaction score, the recipient similarity score, the content interest score, the recipient activeness score, etc.) to calculate the aggregated recipient score for each of the potential recipients. In such an example, the weights to the probability scores can be configured or inferred from historical data of members of the social networking service.

At block 508, the metadata table generating engine 414 generates a metadata table for the plurality of potential recipients based at least in part on the recipient score for each of the plurality of potential recipients. In other words, the metadata table generating engine 414 generates a table of records for potential recipients and their relevance to unpublished content type. The metadata table generating engine 414 is responsible for translating probability scores into factors related to content. For example, this engine can use the probability scores of different aspects as calculated by the recipient scoring engine 412 to determine to whom content is relevant, which intended recipients will like the content, which intended recipients will forward it, etc. The metadata table is leveraged to improve the accuracy of the system by using it in the feedback loop for future posts. The metadata table includes information such as who among social group members may be more interested in the content, who will read it, who will likely forward/share it, etc. One example of a metadata table is depicted in FIG. 6.

Figure 6:
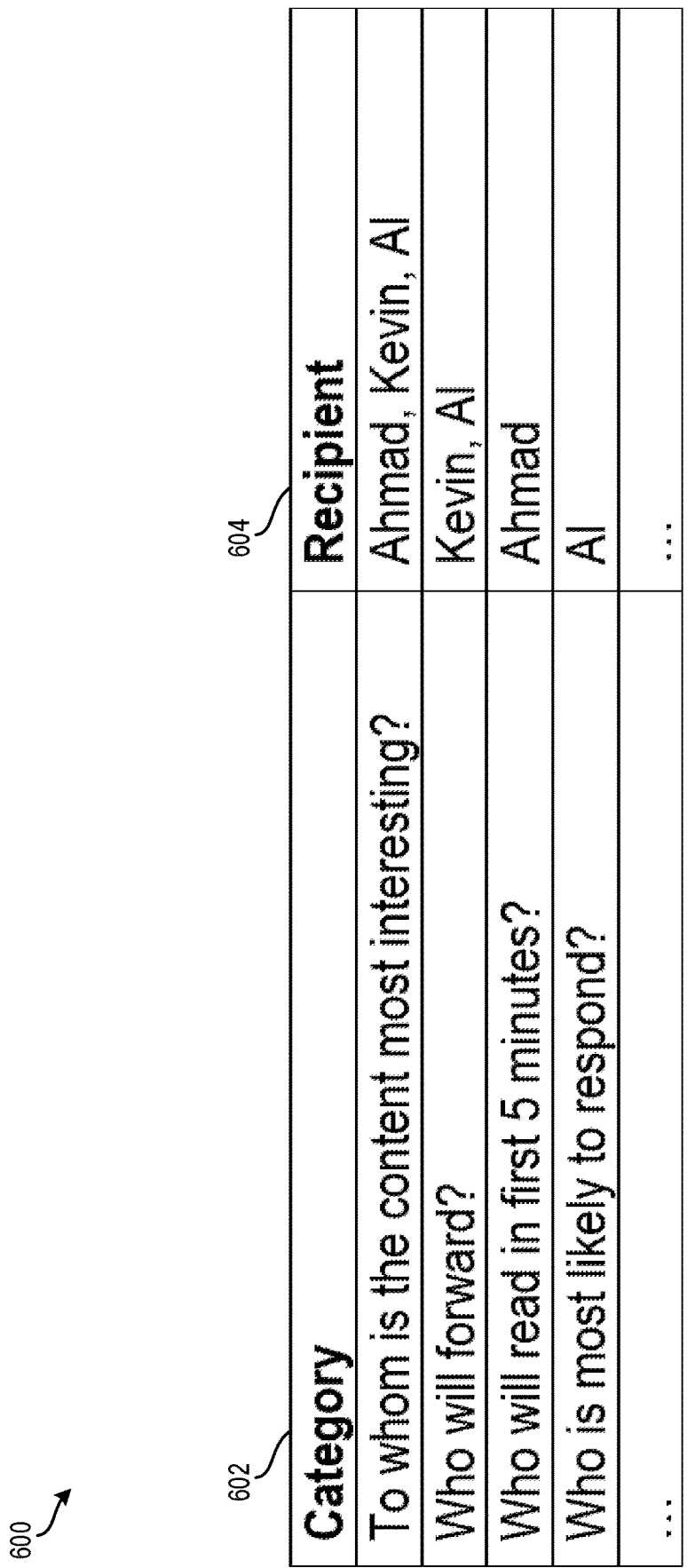
FIG. 6 depicts a metadata table containing metadata about potential recipients according to one or more embodiments described herein.

In particular, FIG. 6 depicts an example of a metadata table 600 containing metadata about potential recipients according to one or more embodiments described herein. In this example, the potential recipients are "Ahmad," "Kevin," "Al," and "Faisal." The metadata table 600 includes columns for "category" 602 and "recipient" 604. Each category 602 and recipient 604 combination (i.e., each row of the metadata table 600) represents who among the potential recipients may be interested in receiving the content. For example, one category 602 asks "To whom is the content most interesting?" with the recipients 604 identified as "Ahmad, Kevin, Al." In another example, another category 602 asks "Who will forward?" with the recipients 604 being identified as "Kevin, Al." Other categories 602 are also possible in addition to those presented in the metadata table 600.

With continued reference to FIG. 5, at block 510, the subgroup generating engine 416 designates a subset of the plurality of potential recipients (i.e., a subgroup) to receive the content based at least in part on the metadata table. Based on the example of FIG. 6, the subgroup generating engine 416 designates potential recipients "Ahmad, Kevin, and Al" as members of the subgroup. It should be appreciated that the intended recipient "Faisal" is not designated as a member of the subgroup because he is not determined to be interested in the content based on the scoring and analysis described herein.

According to one or more embodiments described herein, once the subgroup (i.e., the subset of the plurality of potential recipients) is designated, the content sharing engine 418 shares the content to the subset of the plurality of potential recipients using the social networking service. This can include posting the content to each of the recipient's profile/wall, posting the content to a virtual group that can be created with members being those in the subgroup, etc. In some examples, intended recipients can be "tagged" or otherwise associated with the content to call the recipient's attention to the content.

Additional processes also may be included. According to one or more embodiments described herein, the method can include generating a user interface to display the metadata table to a user (i.e., the user who is posting the content) who can then make an informed decision to whom to direct particular content. It should be understood that the process depicted in FIG. 5 represents an illustration, and that other processes may be added or existing processes may be removed, modified, or rearranged without departing from the scope and spirit of the present disclosure.

Example embodiments of the disclosure include or yield various technical features, technical effects, and/or improvements to technology. Example embodiments of the disclosure provide techniques for social networking service content sharing that improves the accuracy of which content is shared to which recipients by analyzing the content to be shared, analyzing potential recipients to calculate probability scores for the potential recipients, calculating a recipient score for each of the potential recipients based on the probability scores, generating a metadata table based on the recipient score for each potential recipient, and designating a subset of the potential recipients to receive the content based on the metadata table. These aspects of the disclosure constitute technical features that yield the technical effect, in the field of social networking services, of presenting relevant content to members of a social network service who may be interested in seeing such content. Accordingly, content is provided to members who want to see the content, and not shown to members who may not want to see the content, thereby improving the user experience of the social networking service for the posting member and the recipient members. As a result of these technical features and technical effects, the technical solutions described herein represent an improvement to existing social networking service technologies. It should be appreciated that the above examples of technical features, technical effects, and improvements to technology of example embodiments of the disclosure are merely illustrative and not exhaustive.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for social networking service content sharing, the method comprising:

analyzing, by a processing device, content to be shared on a social networking service, the content being directed to a plurality of potential recipients;

analyzing, by the processing device, the plurality of potential recipients to calculate a plurality of probability scores for each of the plurality of potential recipients, wherein calculating the plurality of probability scores for each of the plurality of potential recipients comprises performing a regression calculation;

calculating, by the processing device, a recipient score for each of the plurality of potential recipients based at least in part on the plurality of probability scores for each of the plurality of potential recipients;

generating, by the processing device, a metadata table for the plurality of potential recipients based at least in part on the recipient score for each of the plurality of potential recipients; and designating, by the processing device, a subset of the plurality of potential recipients to receive the content based at least in part on the metadata table.

2. The computer-implemented method of claim 1, wherein analyzing the content comprises performing a content subject analysis.

3. The computer-implemented method of claim 1, wherein analyzing the content comprises performing a content sentiment analysis.

4. The computer-implemented method of claim 1, wherein analyzing the content comprises performing a natural language processing analysis.

5. The computer-implemented method of claim 1, wherein at least one of the plurality of probability scores is a recipient reaction score.

6. The computer-implemented method of claim 1, wherein at least one of the plurality of probability scores is a recipient similarity score.

7. The computer-implemented method of claim 1, wherein at least one of the plurality of probability scores is a content interest score.

8. The computer-implemented method of claim 1, wherein at least one of the plurality of probability scores is a recipient activeness score.

9. The computer-implemented method of claim 1, wherein calculating the plurality of probability scores for each of the plurality of potential recipients comprises performing a weighted average calculation.

10. The computer-implemented method of claim 1, further comprising:

sharing, by the processing device, the content to the subset of the plurality of potential recipients using the social networking service.

11. The computer-implemented method of claim 1, further comprising:

tagging at least one of the subset of the plurality of potential recipients to associate the at least one of the subset of the plurality of potential recipients with the content.

12. The computer-implemented method of claim 1, further comprising:

updating the content based at least in part on the metadata table to increase a size of the subset of the plurality of potential recipients that receive the content.

13. A system comprising:

a memory comprising computer readable instructions; and a processing device for executing the computer readable instructions for performing a method for social networking service content sharing, the method comprising:

analyzing, by the processing device, content to be shared on a social networking service, the content being directed to a plurality of potential recipients;

analyzing, by the processing device, the plurality of potential recipients to calculate a plurality of probability scores for each of the plurality of potential recipients, wherein calculating the plurality of probability scores for each of the plurality of potential recipients comprises performing a regression calculation;

calculating, by the processing device, a recipient score for each of the plurality of potential recipients based at least in part on the plurality of probability scores for each of the plurality of potential recipients;

generating, by the processing device, a metadata table for the plurality of potential recipients based at least in part on the recipient score for each of the plurality of potential recipients; and designating, by the processing device, a subset of the plurality of potential recipients to receive the content based at least in part on the metadata table.

14. The system of claim 13, wherein analyzing the content comprises performing a content sentiment analysis.

15. The system of claim 13, wherein the method further comprises:

sharing, by the processing device, the content to the subset of the plurality of potential recipients using the social networking service.

16. The system of claim 13, wherein the method further comprises:

tagging at least one of the subset of the plurality of potential recipients to associate the at least one of the subset of the plurality of potential recipients with the content.

17. The system of claim 13, wherein the method further comprises:

updating the content based at least in part on the metadata table to increase a size of the subset of the plurality of potential recipients that receive the content.

18. A computer program product comprising:

a computer readable storage medium having program instructions embodied therewith, the program instructions executable by a processing device to cause the processing device to perform a method for social networking service content sharing, the method comprising:

analyzing, by the processing device, content to be shared on a social networking service, the content being directed to a plurality of potential recipients;

analyzing, by the processing device, the plurality of potential recipients to calculate a plurality of probability scores for each of the plurality of potential recipients, wherein calculating the plurality of probability scores for each of the plurality of potential recipients comprises performing a regression calculation;

calculating, by the processing device, a recipient score for each of the plurality of potential recipients based at least in part on the plurality of probability scores for each of the plurality of potential recipients;

generating, by the processing device, a metadata table for the plurality of potential recipients based at least in part on the recipient score for each of the plurality of potential recipients; and designating, by the processing device, a subset of the plurality of potential recipients to receive the content based at least in part on the metadata table.

19. The computer-implemented method of claim 1, wherein the plurality of probability scores for each of the plurality of potential recipients comprises two or more of a recipient reaction score, a recipient similarity score, a content interest score, and a recipient activeness score.

20. The computer-implemented method of claim 1, wherein the plurality of probability scores for each of the plurality of potential recipients comprises a recipient reaction score, a recipient similarity score, a content interest score, and a recipient activeness score, and wherein the recipient score for each of the plurality of potential recipients is calculated based on a weighted average of the recipient reaction score, the recipient similarity score, the content interest score, and the recipient activeness score.

* * * * *